(12) United States Patent
Bass et al.

(10) Patent No.: US 6,327,074 B1
(45) Date of Patent: Dec. 4, 2001

(54) DISPLAY MEDIUM USING EMITTING PARTICLES DISPERSED IN A TRANSPARENT HOST

(75) Inventors: Michael Bass, Orlando; Hans Jennsen, Palm Harbor, both of FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/448,657

(22) Filed: Nov. 24, 1999

Related U.S. Application Data

(60) Provisional application No. 60/109,837, filed on Nov. 25, 1998.

(51) Int. Cl.[7] ............................. G02F 1/361; G11C 13/00
(52) U.S. Cl. ......................... 359/326; 365/151; 501/40; 501/126; 501/152
(58) Field of Search .................................... 359/326–332; 365/151; 501/40, 50, 64, 78, 101, 123, 126, 152, 900, 904–906; 372/6, 39–42

(56) References Cited

U.S. PATENT DOCUMENTS

| | | | |
|---|---|---|---|
| 4,791,415 | 12/1988 | Takahashi | 340/701 |
| 4,871,231 | 10/1989 | Garcia, Jr. | 350/144 |
| 5,142,388 * | 8/1992 | Watanabe et al. | 349/69 |
| 5,184,114 | 2/1993 | Brown | 340/701 |
| 5,192,946 | 3/1993 | Thompson | 340/794 |
| 5,317,348 | 5/1994 | Knize | 353/31 |
| 5,359,345 | 10/1994 | Hunter | 345/102 |
| 5,684,621 | 11/1997 | Downing | 359/326 |
| 5,724,062 | 3/1998 | Hunter | 345/102 |
| 5,764,403 | 6/1998 | Downing | 359/326 |
| 5,914,807 | 6/1999 | Downing | 359/326 |
| 5,943,160 | 8/1999 | Downing | 359/326 |
| 5,956,172 | 9/1999 | Downing | 359/326 |
| 6,117,529 * | 9/2000 | Leising et al. | 428/209 |

* cited by examiner

*Primary Examiner*—John D. Lee
(74) *Attorney, Agent, or Firm*—Brian S. Steinberger; Law Offices of Brian S. Steinberger

(57) ABSTRACT

Two and three dimensional color image displays. The displays include a display medium having a substantially uniform dispersion of red, green and blue visible light emitting particles sized between approximately 0.5 to approximately 50 microns therethrough. The particles can be dye doped polymethylmethacrylate(pmma) plastic, and the display medium can be pmma, acrylic plastic or glass. Other particles can be used such as rare earth doped crystals. The two dimensional display uses three laser sources each having different wavelengths that direct light beams to each of three different types of particle in the display medium. Light is absorbed by the particles which then become excited and emit visible fluorescence. Modulators, scanners and lens can be used to move and focus the laser beams to different pixels in order to form the two dimensional images having different visible colors.

20 Claims, 8 Drawing Sheets

DISPLAY MEDIUM USING EMITTING PARTICLES DISPERSED IN A TRANSPARENT HOST

This invention relates to displays, and in particular to a method and apparatus for creating two dimensional and three dimensional red, green and blue color displays from using laser beams that are directed at micron sized particles such as dye doped plastics that are uniformly dispersed in transparent host type medias such as plastics, and was funded in part under U.S. Army Contract DAAD199910220, and claims priority to U.S. Provisional Application No. 60/109837 filed by the same subject inventors and assignee as the subject invention on Nov.25, 1998.

BACKGROUND AND PRIOR ART

Two dimensional and three dimensional displays are well known to be made monochromatic displays. However, monochromatic does not offer the detail such as shown using red, green and blue colors.

Displays using liquid crystals have been proposed of generating color displays. See for example, U.S. Pat. Nos. 5,359,345 and 5,724,062 to Hunter. However, these patents require arranging individual pixels in rows and corresponding columns, column 4, lines 36–39. The devices described can be expensive and complicated to manufacture, can have a narrow angular view ranges with low brightness.

Additional display systems have been proposed with similar problems to those described above. See for example, U.S. Pat. No. 4,791,415 to Takahashi; U.S. Pat. No. 4,871,231 to Garcia, Jr.; U.S. Pat. No. 5,184,114 to Brown; U.S. Pat. No. 5,192,946 to Thompson et al.; and U.S. Pat. No. 5,317,348 to Knize.

Several patents have been proposed for panel displays using two-frequency upconversion fluorescence. See for example, U.S. Pat. Nos. 5,684,621; 5,764,403; 5,914,807; 5,943,160; and 5,956,172 all to Downing. The Downing '403 patent appears to be the most relevant to the subject invention. Downing '403 is primarily concerned with embodiments where the use different layers for red, green and blue emitters, abstract, FIG. 6, briefly describes some mixing in mixing of only crystal type materials in a single display media. However, for the single display media, Downing '403 uses nanometer sized particles, column 4, lines 33+, column 9, lines 42–45, which would inherently be difficult to form, handle and disperse in a display medium.

SUMMARY OF THE INVENTION

The first objective of the present invention is to provide an inexpensive system for forming two dimensional and three dimensional displays.

The second object of this invention is to provide a system for uniformly dispersing micron sized particles in a transparent host media for two and three dimensional displays.

The third object of this invention is to provide a two and three dimensional display media using dye doped plastics uniformly dispersed in a plastic transparent host media.

The invention covers uniformly dispersing particles of approximately 0.5 microns to approximately 50 microns in a transparent host display medium. The particles can be dye doped plastics, rare earth doped crystals, and the like, in display mediums such as plastic, acrylic plastic, and glass. The first preferred embodiment includes up to three lasers each emitting a laser beam at a different wavelength elected to excite specific groups of particles in the laser beam illuminated areas of the display medium. There are three different particulate types, with selected amounts of each uniformly dispersed in the display medium. One particle type when excited by a first laser beam emits a red visible fluorescence, a second particle type when excited by the second laser beam emits a green visible fluorescence, and a third particle type when excited by the third laser beam emits a blue visible fluorescence. The two dimensional display does not require a matched index of refraction between the particles and the display medium.

A second embodiment is for a three dimensional display having up to six laser beams, each being emitted at a different wavelength. Similar to the first embodiment, the display medium has a substantially uniform dispersement of red, green and blue particles therethrough. A pair of laser beams is directed so that the beams intersect at a specific location in the display medium. One pair of intersecting beams that excites a first particle type that then emits red fluorescence, another intersecting pair emits green fluorescence, and a third pair of intersecting beams with a third particulate type emits blue fluorescence. The three dimensional display requires a matched index of refraction between the particles and the display medium.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
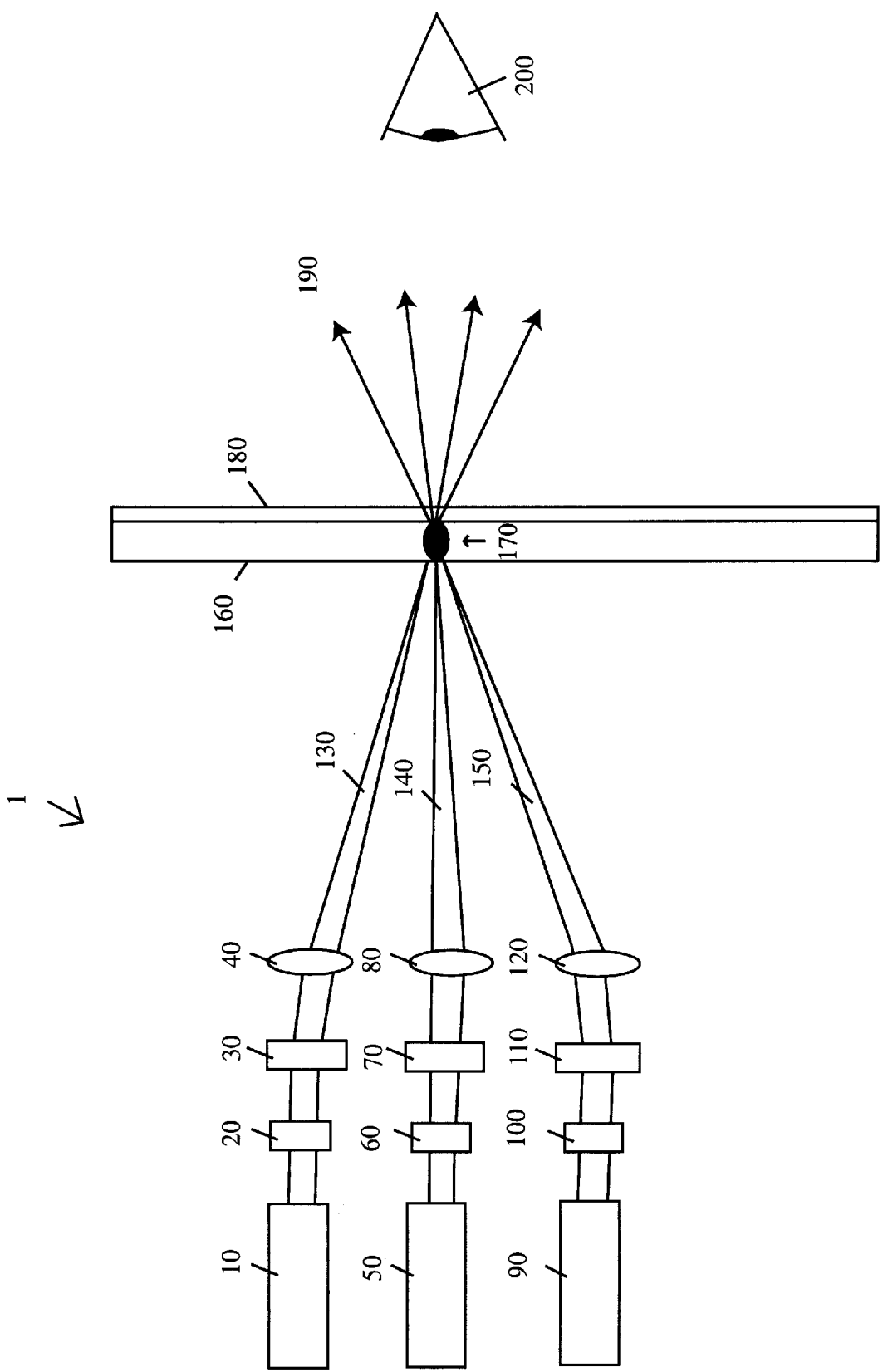
FIG. 1A illustrates a two dimensional display of the subject invention using three lasers.
Figure 1B:
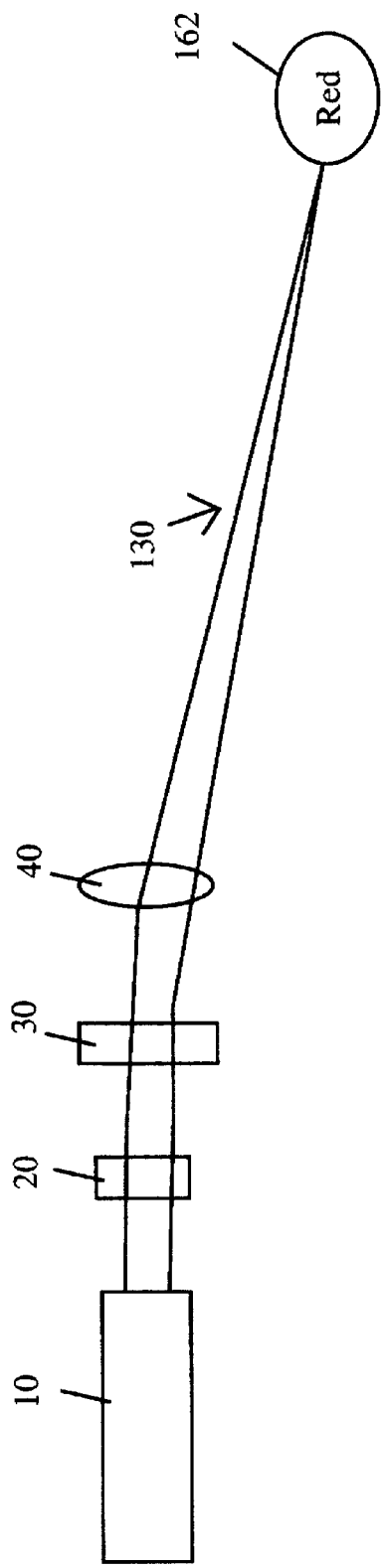
FIG. 1B shows a single light source and beam management system of FIG. 1A.

FIG. 1A illustrates a two dimensional display 1 of the subject invention using three lasers. FIG. 1B shows a single light source and beam management system of FIG. 1A. Referring to FIGS. 1A–1B, lasers 10, 50 and 90 can be diode lasers such as those manufactured by Spectra Diode Co., OptoPower, and Coherent Co., Inc. Laser 10 emits a wavelength λ1 that excites red emitter particles. Laser 50 emits a wavelength λ2 that excites green emitter particles. Laser 90 emits a wavelength λ3 that excites blue emitter particles.

Modulators 20, 60 and 100 can be electro optic modulators by Lasermetrics, Co., an acousto-optic modulator by Newport Electro Optical Systems, or a direct drive to the power supply of the diode laser that can be modulated for the display. The modulators 20, 60 and 100 control the intensity (power) or on and off states of the light emitted from lasers 10, 50, 90, respectively.

Scanners 30, 70 and 110 are used to control the direction of the light from the laser sources 10, 50, 90 to be incident at any location in the display medium 170. Scanners 30, 70 and 110 can chosen from a rotating mirror, galvanometer mounted mirror, rotating prism scanner sold by Speed Ring Co.. Alternatively, Scanners 30, 70 and 110 can be acousto-optic scanners manufactured by Newport Electro Optical Systems, a Binary, liquid crystal based scanners, and the like.

Optics 40, 80 and 120 are optics such as lens, and the like, that can focus the laser light into the specific location within the display medium 170. Optics can help achieve the selected display resolution(e.g., number of resolvable display points per unit length along either the height or width of the display).

130, 140 and 150 refer to the modulated, scanned and focused beams of light from their respective laser source, modulator, scanner and optics that are directed towards selected locations in display medium 160.

Display medium 160(shown and described in greater detail in reference to FIG. 2) has a thickness that is substantially thinner than its height or width with particles of materials that can emit red, green and blue visible light when excited by light from lasers 10, 50 and 90. Particles of materials can emit red, green, and blue visible light by either one or two photon absorption excitation distributed substantially uniformly throughout a passive host medium. 170 refers to a selected region in display medium 160 that is excited by light from any or all of the lasers 10, 50 and 90 to emit, red, green and blue light, and any combinations thereof. All red, green and blue particles are intermixed together in each of the pixels that make up the display medium, so that an individual pixel contains many red, green and blue emitting particles. Light from one of the lasers is directed to individual pixels, so that the light excites whatever specific color emitting particles are located in that pixel. For example, if the laser light is for red emissions, whatever red emitting particles that are located in that pixel are excited. Filter 180 can be a filter material manufactured by Schott Industries. The filter material absorbs light 130, 140 and 150 and transmits the visible emitted light 190. As filter material filter 180 blocks out or reflects light from lasers 10, 50 and 90 from reaching observer 200. Alternatively, filter 180 can be a thin film reflector manufactured by VLBC or CVI that reflects laser light 130, 140, and 150 and transmits the visible emitted light 190.

Figure 2:
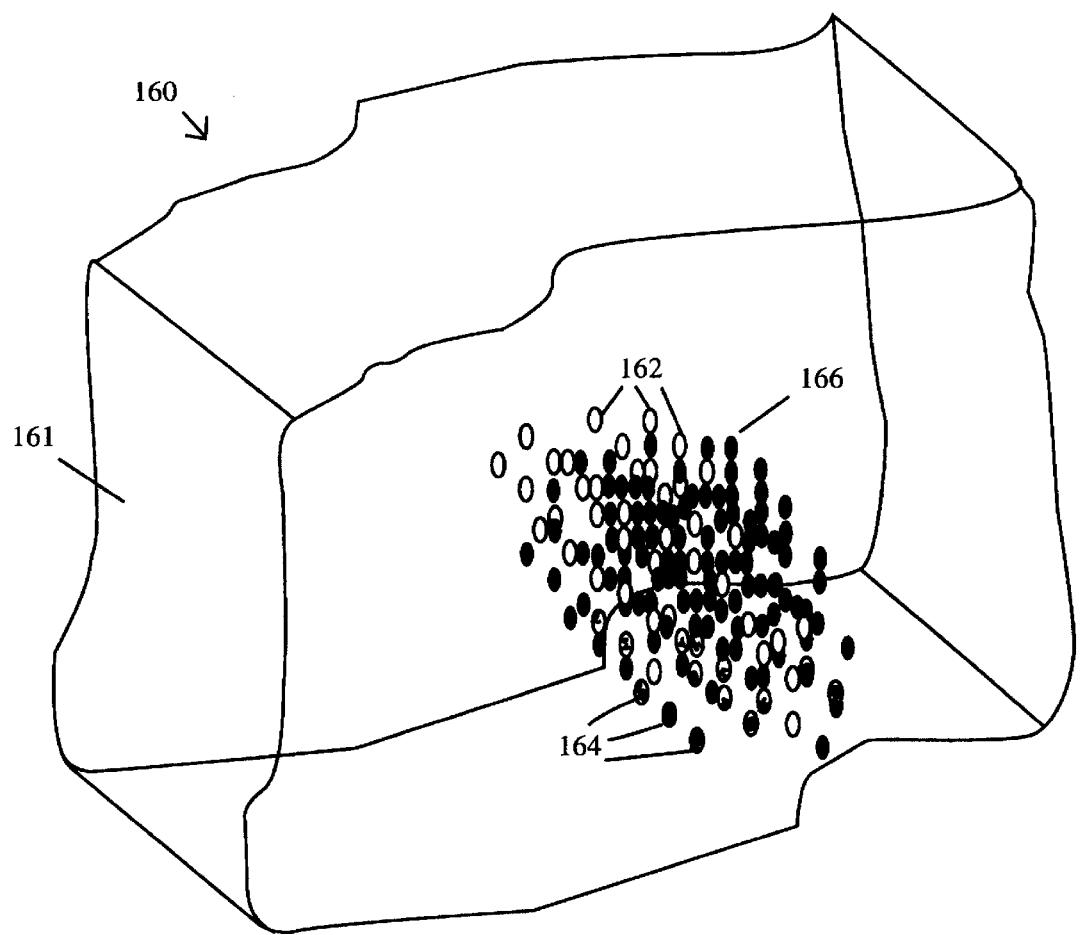
FIG. 2 shows a display media of FIGS. 1A–1B for producing three colors in two dimensions.

FIG. 2 shows a display medium 160 of Figures 1A–1B for producing three colors in two dimensions. Display medium 160 contains a substantially uniform distribution of three different types of particles that can emit visible light when excited by either one or two photon absorption. Particles 162 are selected to emit red visible light. Particles 164 are selected to emit green visible light and particles 166 are selected to emit blue visible light. Thus, by selectively exciting only one type of particles to emit, one can obtain color from the display 160. Selectivity in excitation is achieved by selecting emitting particles that can be excited by different wavelengths of incident light. Thus, light source 10 excites the red emitters from particles 162, light source 50 excites the green emitters from particles 164 and light source 90 excites the blue emitters from particles 168.

A preferred embodiment of one of the most inexpensive materials to manufacturer and produce for the particles 162, 164, 166 are dye doped plastics, such as dye doped plastic polymethylmethacrylate(pmma). The dyes can be colored dyes such as rhodmaine B, and rhodaime 6G, and the like. Table 1 which will be described later gives examples of dyes.

Alternative particles 162, 164, 166 that are not as inexpensive to manufacture and produce as dye doped pmma include rare earth doped crystals, transition metal doped crystals, rare earth doped glasses, combinations thereof, and the like.

Rare earth doped crystals offer the most efficient two photon up converters. In particular the host crystal sodium yttrium fluoride(NaYF4) doped with rare earth family emitting ions has been tested by the subject inventors. For example, doping the host crystal with Er(erbium) can produce green, doping the host crystal with Tm(thulium) can produce blue, doping with Ho(holmium) can produce either or both red and green, and doping with Pr(praesodymium) can produce red, green, &/or blue emissions. Adding co-dopant such as Yb(ytterbium) to the doped crystals can be done to improve the emission. Next the host crystal containing the emitting ions(doped rare earth materials) is placed into a liquid state of pmma and thoroughly mixed into the pmma until the particles are substantially uniformly mixed throughout the pmma.

The Particles 162, 164, 166 can be conventionally ground up and sieved. The novel sized particles are individually sized in the range of approximately 0.5 microns to approximately 50 microns. This sizing are to maximize absorption of pump light and consequently, the emission.

The display medium 161 is transparent and can be formed from materials such as pmma, acrylic plastic, epoxy, glass, and the like. The overall size of the display medium can range from less than 1 centimeters square to a few meters square or more.

The particles 162, 164 and 166 are mixed in the display medium 161 while the latter is in a liquid type state, until the particles are substantially uniformly dispersed throughout the display medium 161, which later hardens over time. All the particles 162, 164 and 166 can be of uniform size within the range of approximately 0.5 microns to approximately 50 microns when the display medium 161 applications call for uniform emissions of red, green and blue. Additionally, each of the particles 162, 164 and 166 can be variably sized within the range of approximately 0.5 microns to approximately 50 microns as would be needed for specific applications where more of one color is needed for the display itself.

The entire display volume 161 can contain particles 162, 164, 166 that make up between the range of approximately 1/10% to approximately 99.9% of the overall volume of the display medium 161.

Each pixel is sized to contain selected amounts of particles 162, 164, and 166. For example, if a pixel is considered to have a diameter of D, and if the number of particles is n, then the dimension of each particle is less than or equal to D divided by the square root of n. The area of a single particle would be equal to D squared divided by n. For a pixel having a diameter of 500 microns by 500 microns, and the display is 1 micron thick, the pixel area would be 25,000 microns and if each particle size were approximately 1 micron by 1 micron, there could be as many as approximately 25,000 particles. Where an embodiment of the display would have substantially equal numbers of red, green and blue emitters there would be approximately 8333 particles of each type. The example, changes if the display &/or the particle size &/or the pixel size changes.

For a 2 dimensional display all the pixels must contain a substantially equal number and distribution of particles 162, 164, 166 throughout the display.

A two dimensional display using the subject invention does not have to have a matching index between the particles 162, 164, 166 and the display medium 161 itself. For a matching index between the display medium 161 and the particles 162, 164, 166, visible light can be observed from both sides of the display medium 161. If there is an unmatched index between the display medium 161 and the particles 162, 164, 166, visible light to the observer 200 would appear to be scattered.

Thus, for a two dimensional display having a matching index, the particles 162, 164, 166 can be dye doped pmma and the display medium 161 can be pmma. Additionally, for a two dimensional display having an unmatching index, the particles 162, 164, 166 can be dye doped pmma, and the display medium 161 can be formed from glass.

Figure 3:
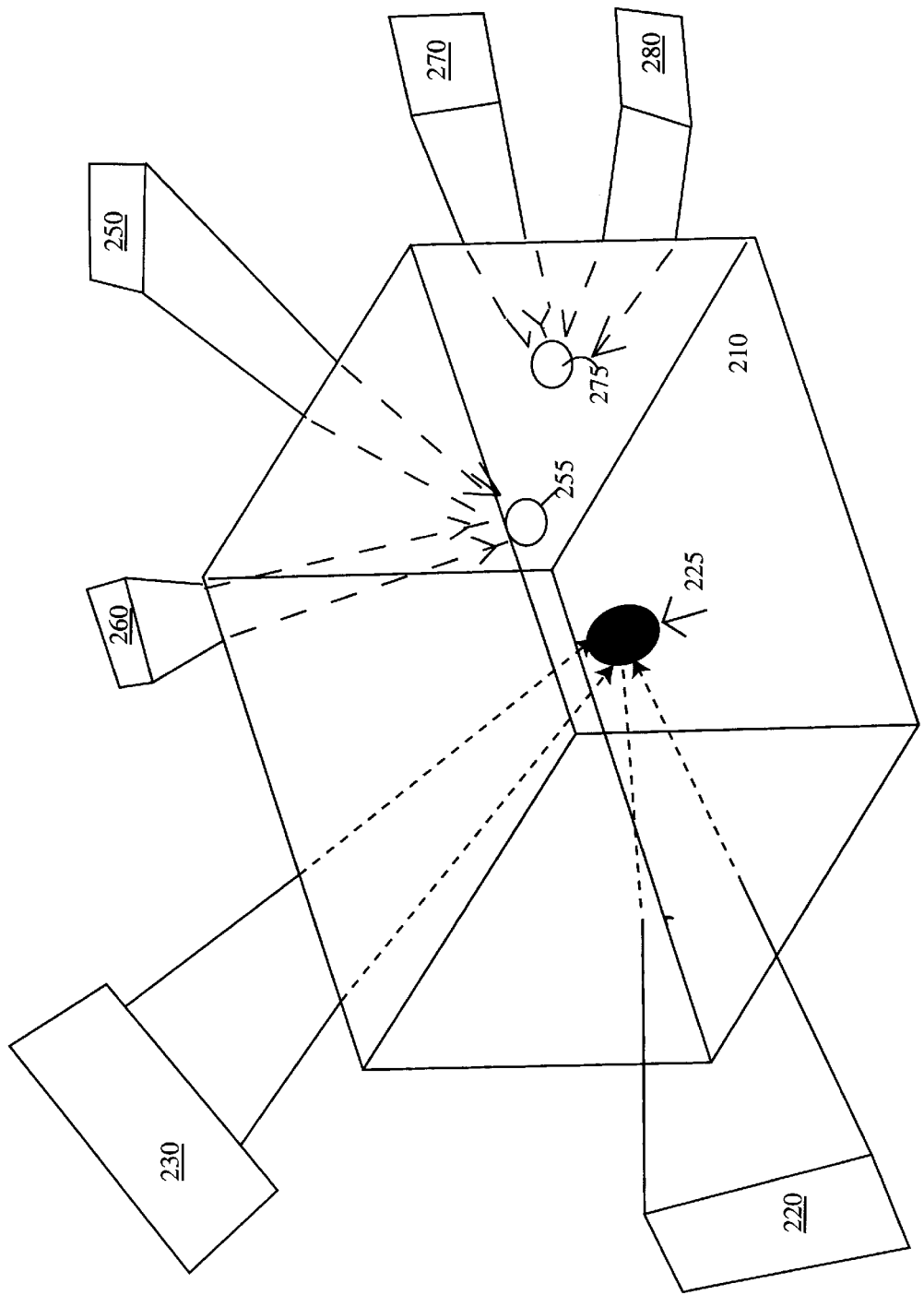
FIG. 3 shows a display media for producing three colors in three dimensions.

FIG. 3 shows a display for producing three colors in three dimensions. Referring to FIG. 3, display medium 210 can be formed from material similar to that described in reference to display medium 170 above. For a three dimensional display, medium 210 can be formed into an object having a shape such as a cube, a cylinder, rectangular parallelepiped. The overall size of the display medium 210 can range from approximately a few cubic centimeters to approximately several cubic meters, and more. For three dimensional displays, an intersection of two different wavelengths is needed to excite visible fluorescent light. 220 and 230 refer to beams of light each being emitted at different wavelengths of near infrared or infrared light. Beam 220 can originate from components 10–40, and beam 230 can originate from components 50–80 as described in reference to FIGS. 1A–1B. For purposes of this example, volume element (voxel) 225 is chosen to emit red visible light only when beams 230 and 220 intersect together and excite the red emitters present in voxel 225, and not the green emitters and not the blue emitters. Thus, the point of intersection of 220 and 230 will emit red visible light. The modulators 20, 60, scanners 30, 70 and optics 40, 80 move the beams 220, 230 intersection point to any point in the volume of the display medium 210. In this manner the intersection point traces out a three dimensional image. 260 and 250 refer to two other different wavelength light beams that intersect at voxel 255 that can excite the green emitters, and different wavelength light beams 270 and 280 can intersect at voxel 275 to excite the blue emitters. Each of the different wavelength light beams 220, 230, 250, 260, 270, 280 can originate from different laser sources similar to those previously described.

Unlike the two dimensional displays, for a three dimensional display there must be substantial index matching between the transparent host display medium material and the particles because for a three dimensional display the observer must be able to see into the three dimensional display from all angles. Thus, dye doped plastic pmma particles substantially uniformly dispersed in a pmma display medium would work for a three dimensional display. However, dye doped plastic pmma particles inside a lead glass display medium would not work for three dimensional displays since dye doped plastic pmma particles have a low index of refraction while the lead glass has a high index of refraction.

Three dimensional display media sizes can range from small sizes of approximately 5.0 cm on a side, to medium sizes of approximately 25 cm on a side, to large of approximately 1 meter on a side.

For a display media of approximately 25 cm on a side, and 500 voxels in each linear dimension a voxel can be approximately 500 micrometers in diameter. If the crystallites are approximately 10 micrometers in diameter and doped to approximately 1% of the volume then there will be approximately 400 each of red, green and blue emitters per voxel.

Figure 4:
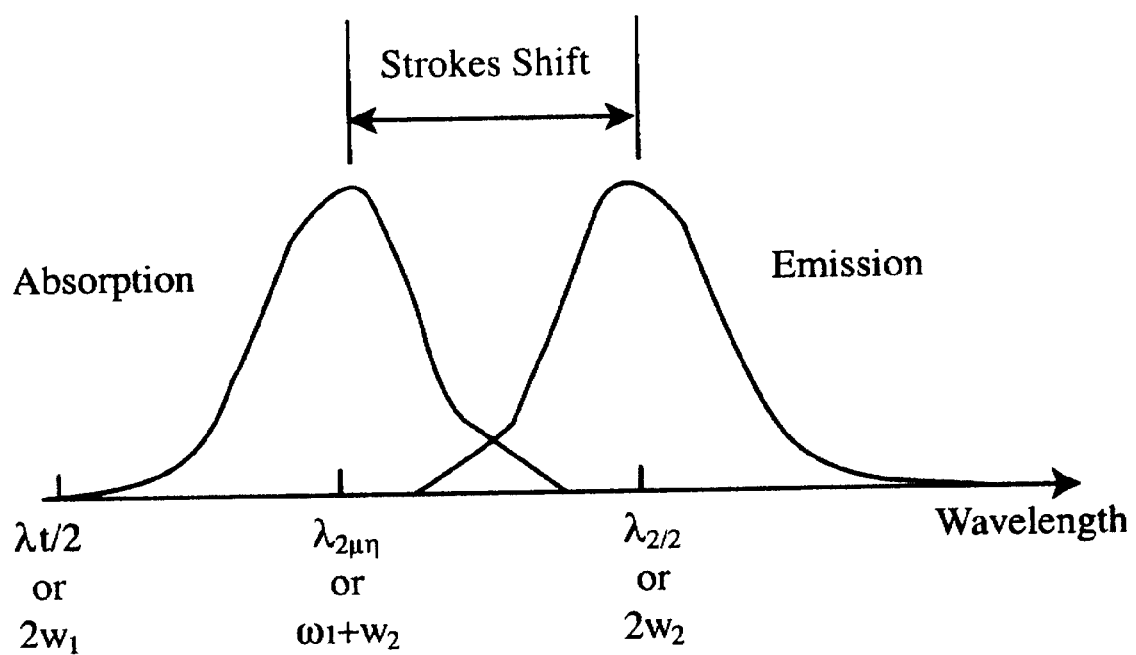
FIG. 4 is a plot of the absorption and emission spectra of a dye solution vs. wavelength.
Figure 5:
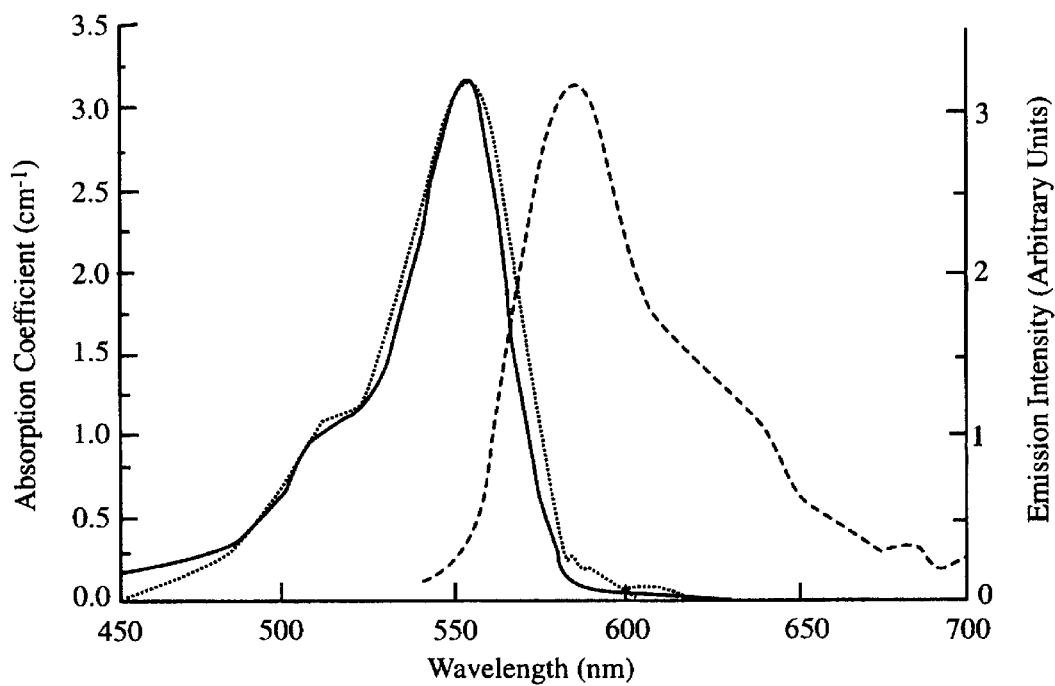
FIG. 5 is an absorption, excitation, and emission spectrum of a solution in methanol.

Experimentation was conducted and will now be described. FIG. 4 is useful in understanding the model for two-photon absorption using two different frequency (wavelength) light sources in an idealized dye solution. Two-photon absorption will take place if the energy of the two photons corresponds to an energy absorbed by the dye. In FIG. 4, the infrared sources are chosen so that twice the frequency of neither source lies in the dye solution's absorption band but that the sum of the frequency of light from each sources does. Since most dye solutions efficiently fluoresce upon absorbing light, wherever the appropriate two different frequency photons are simultaneously present there will be light emission from the excited volume. Linear absorption spectra was measured using a dual-beam spectrophotometer (Perkin-Elmer 330) for both liquid solutions and dye-doped polymers. Excitation spectra were measured using a two double-grating monochomator configuration. Emission spectra were recorded using one double-grating monochromator. The results of such measurements for a solution of $1 \times 10^{-5}M$ pyrromethene in methanol are given in FIG. 5.

Two-photon absorption experiments were performed using either a Q-switched neodymium-doped yttrium aluminum garnet ($Nd^{3+}$: YAG) laser, or a Q-switched chromium-doped lithium strontium aluminum fluoride ($Cr^{3+}$: LiSAF) laser, or both depending on the peak absorption wavelength of the dye studied. Visible emission was detected through a monochromator by a type I photomultiplier. The pump pulses were monitored by fast PIN photodiodes having 0.5 ns response times.

Figure 6A:
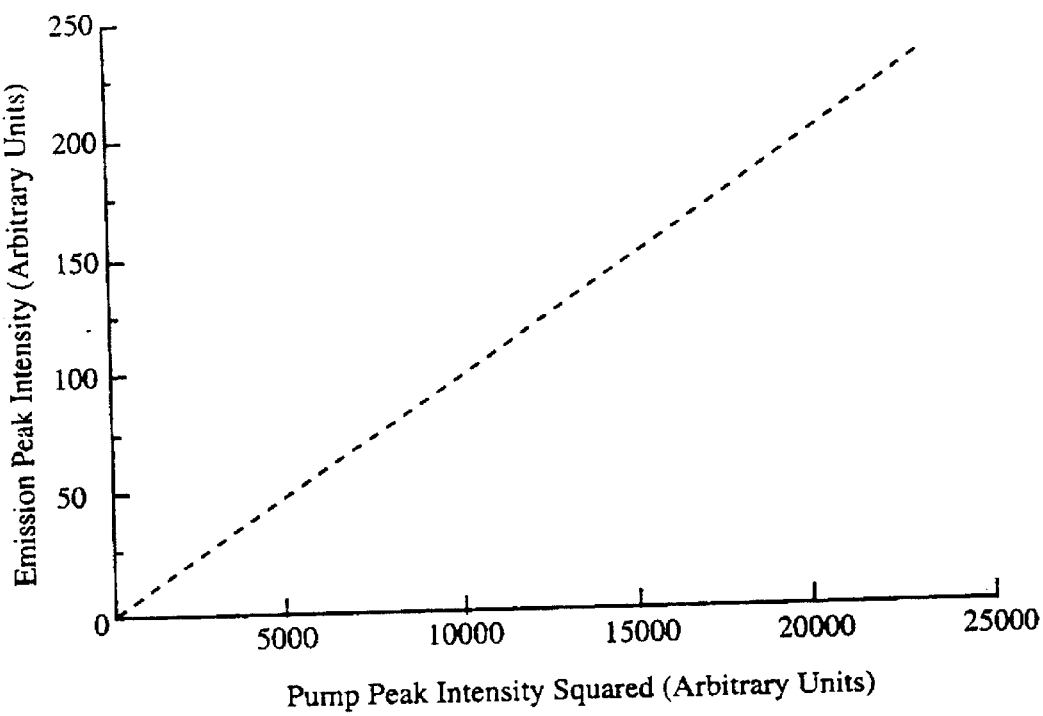
FIG. 6A is a visible emission peak intensity vs. the square of the pump peak intensity in a solution of rhodamine in ethanol.
Figure 6B:
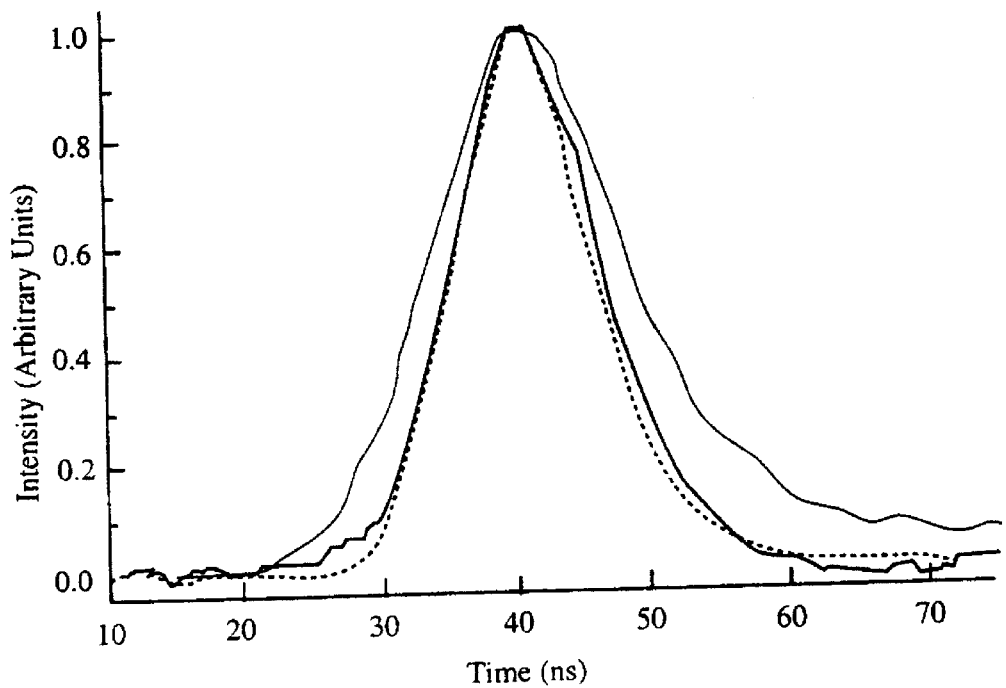
FIG. 6B is a two photon absorption excitation in a solution of rhodamine in ethanol.

In order to demonstrate the absorption of two photons of the same wavelength in the dye solutions and in the dye-doped polymers, we needed to prove the dependence of the visible emission intensity on the square of the intensity of the pump. The necessary proof in both liquid solutions and dye-doped polymers was obtained by varying the peak pump intensity and monitoring the resulting peak intensity of the signal. Calibrated neutral density filters were placed in the pump beam in these experiments. Data obtained from such measurements for a solution of 5×10−4 M rhodamine pumped by the Q-switched $Nd^{3+}$: YAG laser are shown in FIG. 6A and demonstrated the square-law relationship. Additional confirmation was obtained since our detection system was fast enough to show that the signal wave form (e.g., the visible light intensity as a function of time) follows exactly the square of the pump pulse wave form. This type of data for the same dye solution is given in FIG. 6B. It is clear that the visible emission observed is due to two-photon absorption of the single pump source.

Two-photon absorption of a single infrared pump wavelength was observed in several of the dye-doped polymers (see Table I). Some of the samples showed very strong visible emission and some much weaker. These plastics were designed for use in advertising displays and were not optimized for the present study. As a result, quantitative measurement of the emitted light was deferred until improved materials are received. In Table I, the blue CYRO plastics 6122-8 and 6141-8 are seen to have produced no visible emission under excitation at 850 nm. However, these two samples emitted quite well in the blue when excited with the $Cr^{3+}$: LiSAF laser tuned to 800 nm (their absorption coefficient at 400 nm is about $20cm^{-1}$). As a result, visible emission by dye-doped polymers of blue, green, yellow, and red light was obtained.

Experiments to show the absorption of two photons of two different infrared wavelengths in the dye solutions were conducted using both the Nd: YAG and Cr: LiSAF lasers. The use of a Stanford Research System model DG 535 pulse generator to Q switch both lasers resulted in very little interpulse jitter.

Figure 7:
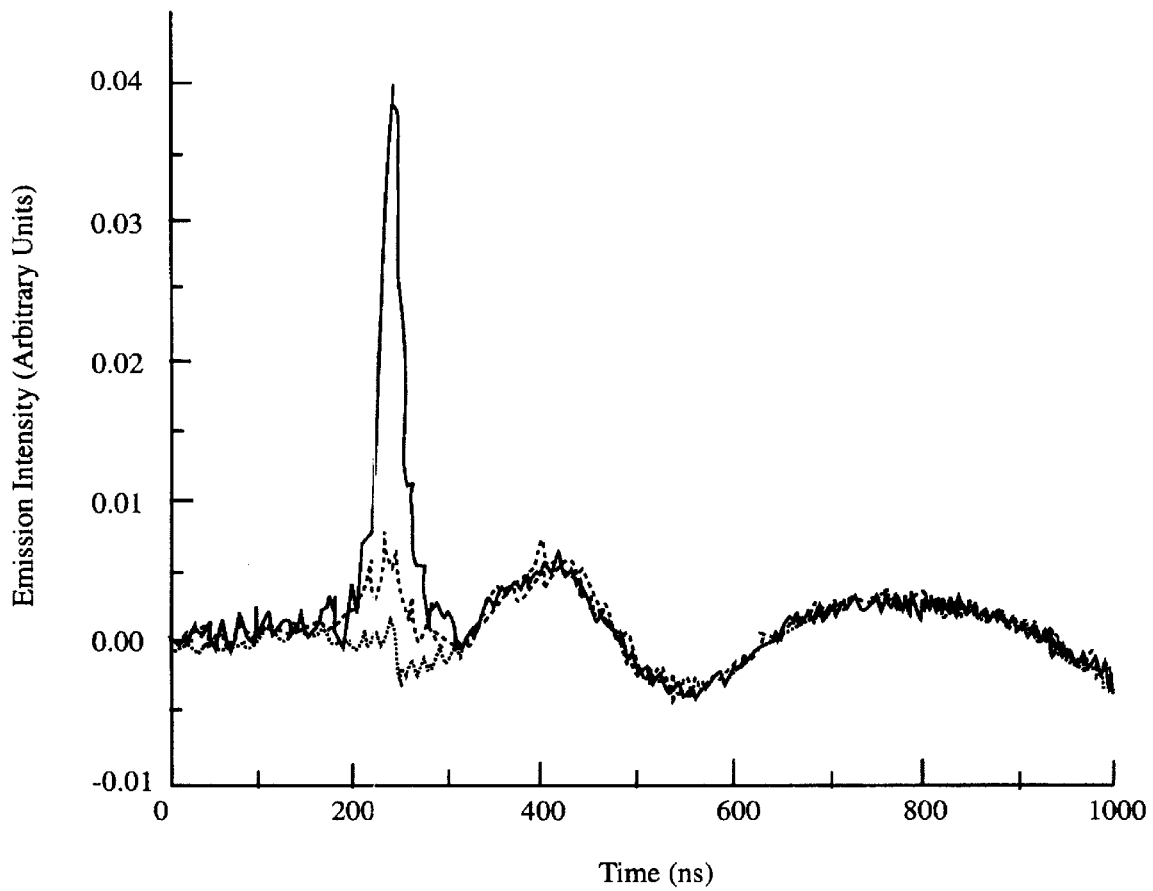
FIG. 7 shows the visible light emission excited in a solution of phyromethene in methanol by simultaneous two photon absorption of pump light at 1064 and 805 nm.

FIG. 7 demonstrates the visible emission by simultaneous absorption of two different frequency infrared light sources. In it, traces show no visible emission for the 1064 nm pump source alone and very little when using 805 nm alone. However, when both are delivered simultaneously there is strong visible light emission.

It should be noted that in some dye solutions with too small a Stokes shift, overlap between the absorption and emission regions causes the color of the observed visible emission to depend on the location of the emitting site within the sample. Thus, a solution that emits yellow light near the surface appears to emit a more reddish color when excited in the center of the sample. To reduce this effect, dye solutions with large Stokes shift (such as obtained in solutions of coumarin dyes) will be more attractive candidates for 3D display applications.

The experiments reported show that dyes in liquid and polymeric solutions can be excited to emit visible light by simultaneous absorption of two different infrared light sources. Since the region of overlap of two such beams can be moved around within the volume of such a medium, the visible emissions can be made to trace out a three-dimensional image. The result would be a real-time, three-dimensional display.

Some of the properties that an appropriately chosen dye should exhibit have already been identified. It should present a large Stokes shift and a narrow absorption band. It should also have a high coefficient of nonlinear absorption as well as high quantum efficiency. However, more research remains to be done to optimize the dye and the host material. The samples studied showed that laser damage was an issue with the laser pulse energies used in the demonstration. Attention should be given to make polymers free of scattering. The use of mode-locked diode lasers should enable the intensities necessary for effective nonlinear excitation of dye-doped media.

Liquid display media could be difficult to handle and possibly dangerous. On the other hand, with proper dye and polymer chemistry, polymers that efficiently emit visible light under the demonstrated excitation can be developed. Such dye-doped polymers will likely be able to serve as one-color displays. When dye/polymer combinations are more fully developed capable of blue, green, and red emission (see Table I) three-color displays are possible. Since it is likely that unwanted intermolecular interactions will occur if all three dyes were placed in the same host, we suggest that the doped polymers could be powdered and then dispersed in a clear passive host polymer. In this model, the concentration of each emitting particulate should be such that there are many in each volume element of the display. As a result, each volume element could emit any desired color. Note that a polymer containing the dispersed particles could be prepared in sheet form and used as a two-dimensional display with single-wavelength excitation sources for each color. The LISA plastics were supplied by CYRO Industries, CT.

TABLE 1

| CYRO[a] LISA plastics Sheet number And color | Emission color | Absorption Coefficient at 532 nm (in $cm^{-1}$) | Visible emission under Nd: YAG excitation | Absorption Coefficient near 425 nm (in $cm^{-1}$) | Visible emission under Cr: LiSAF excitation |
|---|---|---|---|---|---|
| 6122-8 blue | Blue | <0.5 | | 0.6 | |
| 6141-8 blue | Blue | <0.5 | | 0.6 | |
| GPF 564-9 Green | Green | <0.5 | | 7 | ** |
| 3105-5 yellow orange | Yellow | 22 | * | 2 | * |
| 411-5 orange-pink | Yellow | 26 | ** | 1 | *** |
| T-square Orange | Yellow | >40 | *** | 2 | *** |
| 2124-3 dark orange | Orange | >28 | *** | 13 | * |
| 2123-2 orange red | Orange | >32 | *** | 12 | ** |
| 216-4 pink | Orange | 20 | * | 2 | *** |
| 2130-2 pink red | Yellow red | 8 | | 3 | ** |
| 2135-1 red | Yellow red | 16 | * | 7 | ** |

TABLE 1 is a list of dye-doped polymers tested and their properties. The visually observed emission strength is indicated by no asterisks for no emission to three for strong emission. The nonlinear emission was observed either with a 1064 nm Nd:YAG laser focused to about 100 MW/cm2 with the sample or a 850 nm Cr:LiSAF laser focused to 30 MW/cm2.

The invention has many applications. Military such as the Army can be used for terrain map presentation and analysis, visualization and prototyping for design and manufacturing, battlefield awareness and war fighter visualization of the battlefield. Other military and civilian applications are the need for 3D color displays in air traffic control. Medical applications can be used to help train physicians and healthcare providers. Training on medical models of body organs and skeletal structure would allow medical persons to be able to train on images of their patients before and while caring for them.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of displaying two dimensional color images, comprising the steps of:

generating a first light beam having a first wavelength to excite first particles located in a transparent display medium, the first particles include sodium yttrium fluoride(NaYF4) doped with rare earth family emitting ions;

generating a second light beam having a second wavelength to excite second particles in the transparent display medium, the first wavelength being different than the second wavelength, the first particles being different from the second particles;

absorbing the first light beam in the first particles located in the transparent display medium;

absorbing the second light beam in the second particles in the transparent display medium;

forming a first visible light color from the first particles being excited by the first light beam;

forming a second visible light color from the second particles being excited by the second light beam, the first visible color being different from the second visible color; and moving the first light beam and the second light beam to excite different particles in different places in the display medium to form the two dimensional image in two colors.

2. The method of displaying two dimensional color images of claim 1, wherein the first light beam and the second light beam are generated from: a laser diode source.

3. The method of displaying two dimensional color images of claim 1, wherein the first particles and the second particles include: dye doped plastic.

4. The method of displaying two dimensional color images of claim 3, wherein the plastic includes: polymethylmethacrylate(pmma).

5. The method of claim 3, wherein the dye doped plastics includes:

a dye having a large Stokes shift, narrow absorption band, high coefficient of nonlinear aborption and high quantum efficiency.

6. The method of displaying two dimensional color images of claim 1, wherein the first particles and the second particles include:

sizes of approximately 0.5 microns to approximately 50 microns each.

7. The method of displaying two dimensional color images of claim 1, wherein the rare earth family emitting ions are chosen from at least one of:

Br(erbium), Tm(thulium), Ho(holmium) and Pr(praesodymium).

8. The method of displaying two dimensional color images of claim 1, wherein the display medium includes at least one of: polymethylmethacrylate(pmma), acrylic plastic and glass.

9. The method of displaying two dimensional color images of claim 1, wherein the first particles and the second particles are substantially uniformly dispersed in the display medium.

10. A method of displaying three dimensional color images, comprising the steps of:

generating a first light beam having a first wavelength to first particles located in a transparent display medium, the first particles including sodium yttrium fluoride (NaYF4) doped with rare earth family emitting ions;

generating a second light beam having a second wavelength to the first particles, the first wavelength being different from the second wavelength;

intersecting the first beam with the second beam to excite a first visible color;

generating a third light beam having a third wavelength to second particles located in the transparent display medium, the second particles being different from the first particles;

generating a fourth light beam having a fourth wavelength to the second particles, the third wavelength being different from the fourth wavelength;

intersecting the third beam with the fourth beam to excite a second visible color which is different from the first visible color; and moving the intersecting beams to form a three dimensional image having two colors.

11. The method of displaying three dimensional images of claim 10, wherein the first particles and the second particles include: dye doped plastic.

12. The method of displaying three dimensional color images of claim 11, wherein the plastic includes: polymethylmethacrylate(pmma).

13. The method of displaying three dimensional color images of claim 10, wherein the first particles and the second particles each include:

sizes of approximately 0.5 microns to approximately 50 microns each.

14. The method of displaying three dimensional color images of claim 10, wherein the rare earth family emitting ions are chosen from at least one of:

Er(erbium), Tm(thulium), Ho(holmium) and Pr(praesodymium).

15. A method of displaying two dimensional color images, comprising the steps of:

generating a first light beam having a first wavelength to excite first particles located in a transparent display medium, the first particles include dye doped plastics;

generating a second light beam having a second wavelength to excite second particles in the transparent display medium, the first wavelength being different than the second wavelength, the first particles being different from the second particles;

absorbing the first light beam in the first particles located in the transparent display medium;

absorbing the second light beam in the second particles in the transparent display medium;

forming a first visible light color from the first particles being excited by the first light beam;

forming a second visible light color from the second particles being excited by the second light beam, the first visible color being different from the second visible color; and moving the first light beam and the second light beam to excite different particles in different places in the display medium to form the two dimensional image in two colors.

16. The method of claim 15, wherein the dye doped plastics includes:

polymethylmethacrylate(pmma).

17. The method of claim 15, wherein the dye doped plastics includes:

a dye having a large Stokes shift, narrow absorption band, high coefficient of nonlinear absorption and high quantum efficiency.

18. A method of displaying three dimensional color images, comprising the steps of:

generating a first light beam having a first wavelength to first particles located in a transparent display medium, the first particles including dye doped plastics;

generating a second light beam having a second wavelength to the first particles, the first wavelength being different from the second wavelength;

intersecting the first beam with the second beam to excite a first visible color;

generating a third light beam having a third wavelength to second particles located in the transparent display medium, the second particles being different from the first particles;

generating a fourth light beam having a fourth wavelength to the second particles, the third wavelength being different from the fourth wavelength;

intersecting the third beam with the fourth beam to excite a second visible color which is different from the first visible color; and moving the intersecting beams to form a three dimensional image having two colors.

19. The method of claim 18, wherein the dye doped plastics includes:

polymethylmethacrylate(pmma).

20. The method of claim 18, wherein the dye doped plastics includes:

a dye having a large Stokes shift, narrow absorption band, high coefficient of nonlinear absorption and high quantum efficiency.

* * * * *